United States Patent

Launois et al.

[11] Patent Number: 6,035,658
[45] Date of Patent: Mar. 14, 2000

[54] AIR CONDITIONING SYSTEM FOR A MOTOR VEHICLE

[75] Inventors: Jean-Francois Launois, Bonnert, Belgium; Thomas O. Engel, Blieskastel, Germany; Pierre Bugeja, Bridel, Luxembourg; Jean-Jacques Dulin, Margut, France

[73] Assignee: General Motors Corporation, Detroit, Mich.

[21] Appl. No.: 09/151,529

[22] Filed: Sep. 11, 1998

[30] Foreign Application Priority Data

Sep. 26, 1997 [GB] United Kingdom .................... 9720385
Mar. 2, 1998 [GB] United Kingdom .................... 9804259

[51] Int. Cl.[7] .............................. F25B 27/00; F25B 41/00
[52] U.S. Cl. ......................................... 62/324.1; 62/196.4
[58] Field of Search .................................. 62/196.4, 160, 62/117, 324.1

[56] References Cited

U.S. PATENT DOCUMENTS

| | | | |
|---|---|---|---|
| 2,876,629 | 3/1959 | Dube et al. | 62/196.4 X |
| 3,922,875 | 12/1975 | Morris, Jr. | 62/156 |
| 4,286,435 | 9/1981 | Cann et al. | 62/81 |
| 4,742,689 | 5/1988 | Lowes | 62/196.4 X |
| 4,854,130 | 8/1989 | Naruse et al. | 62/352 |
| 5,070,707 | 12/1991 | Ni | 62/234 |
| 5,092,134 | 3/1992 | Tagashira et al. | 62/196.4 X |
| 5,291,941 | 3/1994 | Enomoto et al. | 62/196.4 X |
| 5,404,729 | 4/1995 | Matsuoka et al. | 62/179 |

FOREIGN PATENT DOCUMENTS

| | | |
|---|---|---|
| 0161338 | 11/1985 | European Pat. Off. . |
| 0699883 A2 | 8/1995 | European Pat. Off. . |
| 6-229639 | 8/1994 | Japan . |
| 639313 | 6/1950 | United Kingdom . |
| 1021456 | 3/1966 | United Kingdom . |
| 1214650 | 12/1970 | United Kingdom . |
| 1271119 | 4/1972 | United Kingdom . |
| 1454508 | 11/1976 | United Kingdom . |
| 2149900 | 6/1985 | United Kingdom . |
| 2 202 038 | 9/1988 | United Kingdom . |

Primary Examiner—William Wayner
Attorney, Agent, or Firm—Patrick M. Griffin

[57] ABSTRACT

An air conditioning system (10) for the passenger compartment of a motor vehicle comprising a main tube (22) for fluidly connecting a compressor (12) to an outside heat exchanger (14), the outside heat exchanger to an expansion device (16), the expansion device to an inside heat exchanger (18), the inside heat exchanger to an accumulator (20), and the accumulator to the compressor; a bypass tube (28) fluidly connected to the main tube between the compressor and the outside heat exchanger and between the expansion device and the inside heat exchanger; and a valve (30) positioned in the bypass tube; wherein the valve has a closed position when refrigerant fluid flows through the main tube in a first direction (X) from the compressor through the outside heat exchanger, the expansion device, the inside heat exchanger and the accumulator back to the compressor, for cooling of the passenger compartment, and an open position when refrigerant fluid flows in the first direction and through the bypass tube and the valve for heating of the passenger compartment. Provides supplemental heating without using a calibrated expansion device.

2 Claims, 1 Drawing Sheet

AIR CONDITIONING SYSTEM FOR A MOTOR VEHICLE

TECHNICAL FIELD

The present invention relates to an air conditioning system for a passenger compartment of a motor vehicle, and in particular to an air conditioning system which has a supplemental heating capability.

BACKGROUND OF THE INVENTION

In general, it is known to provide heating for the passenger compartment of a motor vehicle by deviating engine coolant through a heater core which then exchanges heat with air entering the passenger compartment. WO-A-95/24323 describes a system for providing initial or supplemental heating using energy supplied by the compressor of the refrigerant fluid of an air conditioning system, and exchanging this energy with air passing through the inside heat exchanger of the air conditioning system. This heating process makes no use of the outside heat exchanger of the air conditioning system, and only uses the compressor, the inside heat exchanger and an expansion device calibrated in such a way that only refrigerant fluid vapour leaves the inside heat exchanger and passes into the compressor.

Another known supplemental heating system uses the energy of an air conditioning loop called a heat pump. In this case, the inside heat exchanger condenses the refrigerant and exchanges the energy with cold air passing through he inside heat exchanger. The outside heat exchanger can get very cold during this operation, and it is possible that the humidity of the air freezes and blocks the core of the outside heat exchanger, preventing any effective heat exchange. Defrosting of the outside heat exchanger can be achieved by reversing the cycle, which leads to a heating of the outside heat exchanger, but also results in cooling of the inside heat exchanger, and hence cooling of the passenger compartment.

For clarification, the inside heat exchanger is the heat exchanger normally located inside the passenger compartment, and the outside heat exchanger is the heat exchanger normally located outside the passenger compartment.

SUMMARY OF THE INVENTION

It is an object of the present invention to provide initial or supplemental heating in a vehicle air conditioning system without the need for a calibrated expansion device.

An air conditioning system in accordance with the present invention for the passenger compartment of a motor vehicle comprises a main tube for fluidly connecting a compressor to an outside heat exchanger, the outside heat exchanger to an expansion device, the expansion device to an inside heat exchanger, the inside heat exchanger to an accumulator, and the accumulator to the compressor; a bypass tube fluidly connected to the main tube between the compressor and the outside heat exchanger and between the expansion device and the inside heat exchanger; and a valve positioned in the bypass tube; wherein the valve has a closed position when refrigerant fluid flows through the main tube in a first direction from the compressor through the outside heat exchanger, the expansion device, the inside heat exchanger and the accumulator back to the compressor, for cooling of the passenger compartment, and an open position when refrigerant fluid flows in the first direction and through the bypass tube and the valve for heating of the passenger compartment.

The system of the present invention can provide supplemental heating without the need for a calibrated expansion device. In a preferred arrangement, the air conditioning system can act as a heat pump and also provide a de-icing phase for the outside heat exchanger whilst substantially preventing cooling of the passenger compartment.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
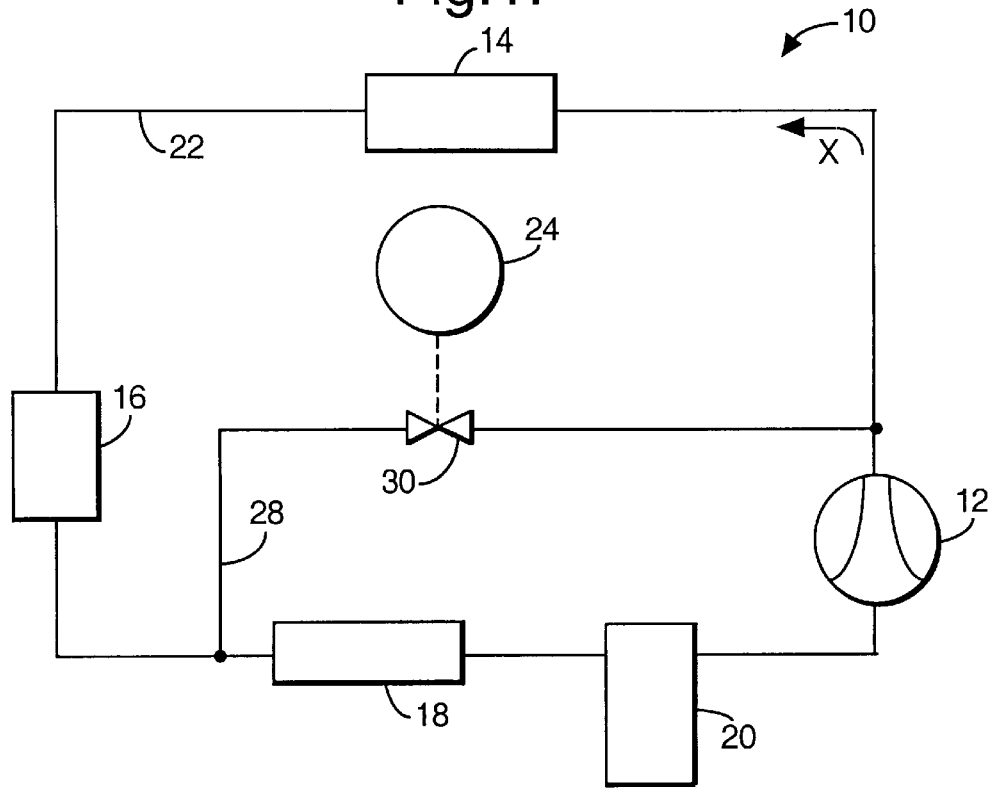
FIG. 1 is a schematic of a first embodiment of air conditioning system in accordance with the present invention.

Referring to FIG. 1 of the drawings, the air conditioning system 10 in accordance with the present invention is for use in a motor vehicle for heating or cooling the passenger compartment (not shown) of the motor vehicle. The air conditioning system 10 comprises the usual components of a compressor 12, an outside heat exchanger 14, an orifice tube or expansion device 16, an inside heat exchanger 18, and an accumulator/dryer 20. These components are connected, as shown in FIG. 1, by a main tube 22 for the circulation of refrigerant fluid in the direction X. These components of the air conditioning system 10 provide cooling for the passenger compartment in a manner well known to those skilled in the art, and will not be described in greater detail.

The present invention provides supplemental heating or initial heating for the passenger compartment (for example, when the vehicle is initially started) by simple modifications to the known arrangement. The air conditioning system 10 further comprises a bypass tube 28 connected to the main tube 22 between the outside heat exchanger 14 and the compressor 12 and between the orifice tube 16 and the inside heat exchanger 18; and a flow switching valve 30 positioned in the bypass tube. The operation of the valve 30 is controlled by control means 24. The valve 30 has a minimum of two operating positions; an open position for fluid flow through the valve, and a closed position to prevent fluid flow through the valve.

During normal operation of the air conditioning system 10, the valve 30 is its closed position and the air conditioning system operates to cool the passenger compartment.

When initial or supplemental heating of the passenger compartment is required, the valve 30 is moved to its open position. In this mode, the pressure drop in the bypass tube 28 and in the valve 30 is lower than the pressure drop created in the main tube 22, in the outside heat exchanger 14, and in the orifice tube 16. As a consequence, most of the refrigerant fluid is forced to circulated through the bypass tube 28, inside heat exchanger 18, accumulator/dryer 20 and compressor 12 only. This arrangement is such that the energy contained in the superheated vapour from the compressor 12 can be transferred to the cold ambient air when flowing through the inside heat exchanger 18. Then the vapour passes into the accumulator/dryer 20 (where any liquid refrigerant fluid is retained), before returning to the compressor 12. By this arrangement, initial or supplemental heating of the passenger compartment is achieved.

Figure 2:
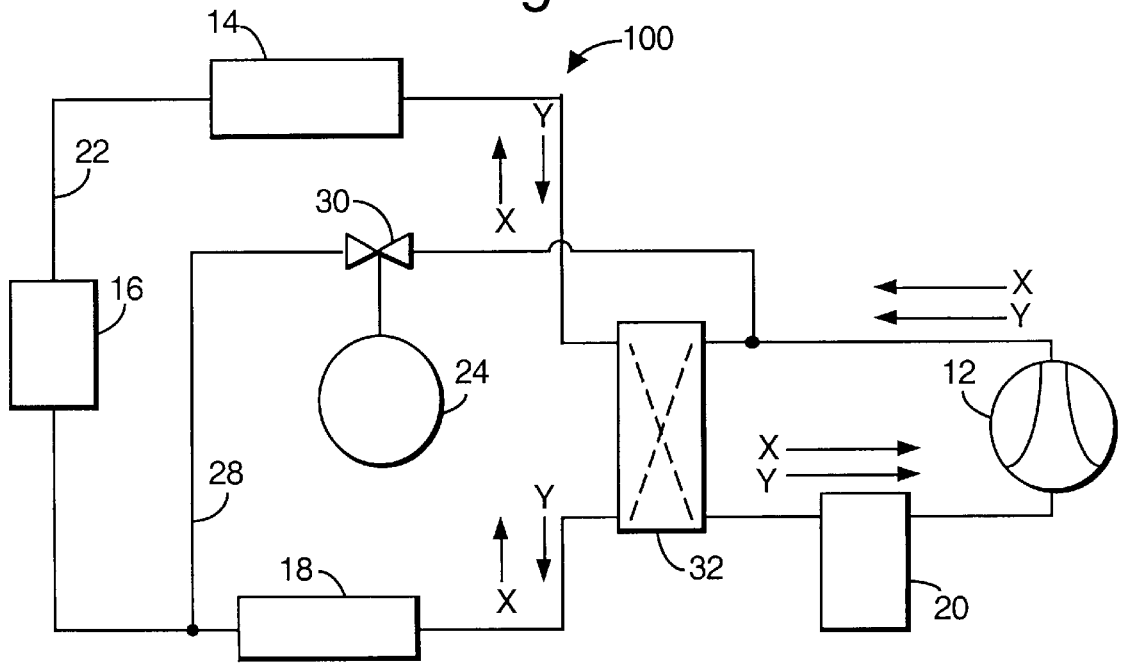
FIG. 2 is a schematic of a second embodiment of air conditioning system in accordance with the present invention.

The second embodiment of air conditioning system 100 shown in FIG. 2 is substantially the same as the first embodiment described above, and like parts have been given the same reference numeral. In this second embodiment, a reversing valve 32 is positioned in the system 100 between the compressor 12 and the outside heat exchanger 14 and between the inside heat exchanger 18 and the accumulator/dryer 20. The bypass tube 28 fluidly connects with the main tube 22 between the reversing valve 32 and the compressor 12. Also, the valve 30 has an intermediate position between the open position and the closed position which allows restricted fluid flow through the valve.

During normal (cooling) operation of the air conditioning system 100, the valve 30 is its closed position and the reversing valve 32 is set to allow fluid flow in the direction X such that the air conditioning system operates to cool the passenger compartment. When initial or supplemental heating of the passenger compartment is required, and the system 100 is in air conditioning (cooling) mode, the valve 30 is moved to its open position. This has the same effect as that described above for the first embodiment of air conditioning system 10 shown in FIG. 1.

When prolonged heating of the passenger compartment is required, the reversing valve 32 is actuated to reverse the flow of refrigerant fluid (in the direction Y) through the inside heat exchanger 18, the orifice tube 16 and the outside heat exchanger 14, during which time, the valve 30 is in its closed position. However, during this cycle, ice can form on the outside heat exchanger 14. In order to remove (melt) the ice, the reversing valve 32 is actuated to switch the air conditioning system 100 to cooling mode (that is, refrigerant fluid flows in direction X). In order to prevent cooling of the passenger compartment (when heating is actually required) during this deicing phase, the valve 30 is moved to its intermediate position. In this intermediate position of the valve 30, refrigerant fluid is allowed to flow through both the main tube 22 and the bypass tube 28 to de-ice the outside heat exchanger 14 and to substantially prevent or limit cooling of the passenger compartment.

Alternative reverse flow means, rather than the reversing valve 32, may be provided in the air conditioning system in accordance with the present invention, with the valve 30 having the capability of moving to an intermediate position as described above.

The control means 24 for operating the valve 30 in either of the above embodiments is preferably a contact relay and a manually operable push button which can be located on the dashboard of the motor vehicle. Alternatively, the control means 24 may be a temperature sensor which is used to automatically control the operation of the valve 30. Where the motor vehicle is equipped with automatic climate control, the relay may be controlled by a microprocessor.

Either of the above described air conditioning systems 10,100 is simpler and cheaper than the arrangement described in WO-A-95/24323 as the present invention does not require an additional specific expansion device.

The heating loop is also less sensitive to charge variations in the refrigerant fluid as the accumulator/dryer 20 retains any excess liquid. The system of WO-A-95/24323 requires a controllable solenoid valve to prevent refrigerant fluid reaching the outside heat exchanger.

The operation of the compressor 12 may be controlled by an electronic control module (not shown) which monitors the temperature and/or the pressure of the refrigerant fluid on the high pressure side of the compressor and controls the operation of the compressor to reduce the flow of fluid by the compressor in order to substantially prevent the risk of high torque on the compressor and increased pressure in the fluid.

We claim:

1. An air conditioning system for the passenger compartment of a motor vehicle consisting of a main tube for fluidly connecting a compressor to an outside heat exchanger, the outside heat exchanger to an expansion device, the expansion device to an inside heat exchanger, the inside heat exchanger to an accumulator, and the accumulator to the compressor; a bypass tube fluidly connected to the main tube between the compressor and the outside heat exchanger and between the expansion device and the inside heat exchanger; and a flow switching valve positioned in the bypass tube; wherein the flow switching valve has a closed position when refrigerant fluid flows through the main tube in a first direction from the compressor through the outside heat exchanger, the expansion device, the inside heat exchanger and the accumulator back to the compressor, for cooling of the passenger compartment, and an open position when refrigerant fluid flows in the first direction and only through the bypass tube and the flow switching valve for heating of the passenger compartment, and, a reverse flow means for reversing the flow of refrigerant fluid in a direction opposite the first direction through the inside heat exchanger, the expansion device and the outside heat exchanger for heating of the passenger compartment when the flow switching valve is closed.

2. An air conditioning system as claimed in claim 1, wherein the flow switching valve has an additional position intermediate the open position and the closed position, and wherein the flow switching valve is placed in the intermediate position when refrigerant fluid flows in the first direction to heat the outside heat exchanger and to substantially prevent cooling of the passenger compartment.

* * * * *